United States Patent [19]

Germanaud et al.

[11] Patent Number: 5,756,565
[45] Date of Patent: May 26, 1998

[54] NON-GELLABLE BITUMEN/POLYMER COMPOSITIONS

[75] Inventors: Laurent Germanaud, Heyrieux; Jean-Pascal Planche, Serezin du Rhone; Trung Kiet Phung, Lyons, all of France

[73] Assignee: Elf Antar France, Courbevoie, France

[21] Appl. No.: 525,602

[22] PCT Filed: Mar. 24, 1994

[86] PCT No.: PCT/FR94/00323
§ 371 Date: Nov. 13, 1995
§ 102(e) Date: Nov. 13, 1995

[87] PCT Pub. No.: WO94/22958
PCT Pub. Date: Oct. 13, 1994

[30] Foreign Application Priority Data

Mar. 26, 1992 [FR] France ............... 93 03492

[51] Int. Cl.⁶ .................................................. C08L 95/00
[52] U.S. Cl. ..................... 524/68; 524/59; 524/69; 524/70; 524/71
[58] Field of Search ........................... 524/59, 68, 69, 524/70, 71

[56] References Cited

U.S. PATENT DOCUMENTS

| | | | |
|---|---|---|---|
| 4,882,373 | 11/1989 | Moran | 524/68 |
| 5,070,123 | 12/1991 | Moran | 524/59 |
| 5,078,905 | 1/1992 | Trinh et al. | 252/182.17 |
| 5,095,055 | 3/1992 | Moran | 524/71 |
| 5,120,777 | 6/1992 | Chaverot et al. | 524/68 |
| 5,225,462 | 7/1993 | Mancini | 524/68 |
| 5,508,112 | 4/1996 | Planche et al. | 524/59 |

*Primary Examiner*—Peter A. Szekely
*Attorney, Agent, or Firm*—Burgess, Ryan & Wayne

[57] ABSTRACT

Non-gellable, high temperature storage-stable bitumen/polymer compositions are provided and which are produced by stirring a sulphur-cross-linkable elastomer, an antigelling adjuvant and a sulphur-donating coupling agent into a bitumen or bitumen mixture at 100°–230° C. The antigelling adjuvant has the formula R—X wherein R is a $C_{2-50}$ monovalent organic radical and X is a carboxylic acid, sulfonic acid or phosphoric acid group. The bitumen-polymer compositions may be used directly or in diluted form in a bitumen or bitumen mixture to form bitumen/polymer binders for producing road surfaces, coating materials or sealing materials.

34 Claims, No Drawings

NON-GELLABLE BITUMEN/POLYMER COMPOSITIONS

BACKGROUND OF THE INVENTION

1. Field of the Invention

The invention relates to non-gellable bitumen/polymer compositions which are stable on storage at high temperature, that is to say, according to the invention, up to temperatures which may reach values of the order of 260° C. The invention also relates to a process for the preparation of such compositions and equally concerns the application of these compositions to the production of bitumen/polymer binders which may be used to make coatings and especially road coatings.

2. Background Art

The crosslinking, via sulphur, of unsaturated elastomers, especially of copolymers of styrene and a conjugated diene such as butadiene or isoprene, in bitumens leads to bitumen/polymer compositions which possess enhanced stability and excellent physico-mechanical characteristics and which may be used to make various coatings, especially road surfacings, mixes or alternatively leaktight coatings, having enhanced characteristics compared with the coatings obtained from bitumens alone.

The preparation of bitumen/polymer compositions of the abovementioned type, for which the elastomer which is crosslinkable with sulphur is a copolymer of styrene and a conjugated diene, is described in particular in the citations FR-A-2,376,188, (U.S. Pat. No. 4,145,322), FR-A-2,528, 439, (U.S. Pat. No. 4,554,313), and EP-A-0,360,656 (U.S. Pat. No. 5,508,112).

The bitumen/polymer compositions of the abovementioned type, from which bitumen/polymer binders are produced for making coatings, especially road coatings, are prepared in practice at polymer contents below a threshold which may range from about 3% to 6% by weight of bitumen depending on the nature and the molecular weight of the polymer, on the one hand, and the quality of the bitumen, on the other hand, gelling of the bitumen/polymer composition which is observed fairly frequently during the preparation of the said composition or while it is stored, occurs as soon as the polymer content of this composition exceeds the abovementioned threshold. It is thus difficult, in practice, to produce non-gellable bitumen/polymer compositions with a high polymer content, which would act as bitumen/polymer concentrates, and are more economical to prepare and to transport than bitumen/polymer compositions with a lower polymer content, and which could be diluted at the time of use, by addition of bitumen, in order to obtain the corresponding bitumen/polymer binders with a lower polymer content which are usually used to make coatings.

SUMMARY OF THE INVENTION

The invention makes it possible to overcome the abovementioned drawbacks by proposing bitumen/polymer compositions of the type including a bitumen and an elastomer crosslinked with sulphur, which are non-gellable, stable on storage at high temperature, that is to say, according to the invention, up to temperatures of the order of 260° C., and are pumpable by means of conventional systems for pumping molten bitumens and which may readily be diluted, if need be, with bitumen in order to produce the bitumen/polymer binders usually used to make coatings and especially road coatings.

The bitumen/polymer compositions according to the invention are of the type consisting of a homogeneous mass formed of a bituminous matrix consisting of a bitumen or of a mixture of bitumens and in which is uniformly distributed an elastomer crosslinked with sulphur, in an amount between 3% and 30% and preferably between 5% and 25% of the weight of the bituminous matrix, and they are characterized in that an adjuvant, acting especially as an antigelling agent, is also present in the bituminous matrix in an amount between 0.1% and 5% and preferably between 0.2% and 3% of the weight of the said matrix, the said adjuvant consisting of one or more compounds of formula R—X, in which R is a monovalent $C_2$ to $C_{50}$ and more especially $C_2$ to $C_{40}$ organic radical and X denotes a functional group chosen from

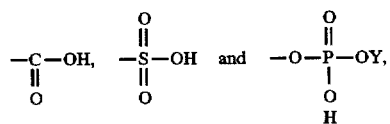

wherein Y representing a hydrogen atom or a radical R.

DESCRIPTION OF THE PREFERRED EMBODIMENTS

A process for the preparation of the bitumen/polymer compositions according to the invention is of the type in which, working at temperatures between 100° C. and 230° C. and with stirring for a period of at least 10 minutes, the bitumen or the mixture of bitumens chosen to constitute the bituminous matrix is placed in contact with, based on the weight of the bituminous matrix, between 3% and 30% and preferably between 5% and 25% of an elastomer which is crosslinkable with sulphur and a sulphur-donating coupling agent in an amount able to give an amount of free sulphur representing 0.1% to 20% and preferably 0.5% to 10% of the weight of the polymer which is crosslinkable with sulphur in the reaction medium formed of the coupling agent, elastomer and bituminous matrix ingredients, and it is characterized in that, during the said placing in contact, the reaction medium contains an adjuvant which acts in particular as an anti-gelling agent, the said adjuvant being used in an amount between 0.1% and 5% and preferably between 0.2% and 3% of the weight of the bituminous matrix and consisting of one or more compounds of formula R—X, in which R is a monovalent $C_2$ to $C_{50}$ and more particularly $C_2$ to $C_{40}$ organic radical and X denotes a functional group chosen from

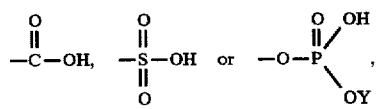

wherein Y representing a hydrogen atom or a radical R.

The bitumen or mixture of bitumens, which is placed in contact with the elastomer which is cross-linkable with sulphur, the anti-gelling adjuvant and the sulphur-donating coupling agent and which constitutes the bituminous matrix of the bitumen/polymer composition, is advantageously chosen from the various bitumens which possess a kinematic viscosity at 100° C. of between $0.5 \times 10^{-4}$ $m^2/s$ and $3 \times 10^{-2}$ ml/s and preferably between $1 \times 10^{-4}$ $m^2/s$ and $2 \times 10^{-2}$ $m^2/s$. These bitumens may be bitumens from direct distillation or from distillation under reduced pressure or alternatively blown or semi-blown bitumens, or even certain petroleum fractions or mixtures of bitumens and distillates under vacuum. Advantageously, besides a kinematic viscosity within the abovementioned range, the bitumen or mixture of bitumens used to produce the compositions according to the invention has a penetrability, defined according to standard NF T 66004, of between 5 and 500 and preferably of between 20 and 400.

The elastomer which is crosslinkable with sulphur, which is used to prepare the bitumen/polymer compositions and which is found crosslinked in the said compositions, may be such as polyisoprene, polynorbornene, polybutadiene, butyl rubber or ethylene/propylene/diene terpolymer (EPDM). The said elastomer is advantageously chosen from random or block copolymers of styrene and a conjugated diene such as butadiene, isoprene, chloroprene, carboxylated butadiene and carboxylated isoprene, and more particular consists of one or more copolymers chosen from block copolymers, with or without a random joint, of styrene and butadiene, of styrene and isoprene, of styrene and chloroprene, of styrene and carboxylated butadiene, or alternatively of styrene and carboxylated isoprene. The copolymer of styrene and conjugated diene, and in particular each of the abovementioned copolymers, advantageously possesses a weight content of styrene ranging from 5% to 50%. The mean viscometric molecular weight of the copolymer of styrene and conjugated diene, and especially that of the copolymers mentioned above, may be between, for example, 10,000 and 600,000 and is preferably between 30,000 and 400,000. The copolymer of styrene and conjugated diene is preferably chosen from the di- or triblock copolymers of styrene and butadiene, of styrene and isoprene, of styrene and carboxylated butadiene or alternatively of styrene and carboxylated isoprene which have styrene contents and viscometric molecular weights within the ranges defined above.

In the adjuvant of formula R—X defined above, the symbol R advantageously represents a saturated or unsaturated $C_2$ to $C_{50}$ and more especially $C_2$ to $C_{40}$ monovalent hydrocarbon radical, the said radical being in particular of the linear or branched alkyl or alkenyl type, for example nonyl, dodecyl, tetradecyl, hexadecyl, octadecyl, octadecenyl, nonadecyl, eicosenyl, docosenyl or tetracosenyl, of the alkylaryl type, for example nonylphenyl, dodecylphenyl, didodecylphenyl, tetradecylphenyl, dodecyltolyl, nonyltolyl, nonylxylyl, dodecylxylyl, dodecylcumenyl or hexadecylphenyl, of the alkadienyl or alkatrienyl type, for example 2,4-decadienyl, 2,4,6- decatrienyl, 9,10-octadecadienyl, or 9,12,15-octadecatrienyl, or alternatively of the polycyclic type with condensed rings, for example the hydrocarbon residue obtained by removal of the carboxylic group from a compound such as abietic acid or a resinous acid derived from abietic acid. Non-limiting examples of anti-gelling adjuvants of formula R—X comprise carboxylic acids containing a saturated or unsaturated fatty chain, such as pelargonic acid, lauric acid, palmitic acid, stearic acid, myristic acid, behenic acid, oleic acid, erucic acid, linoleic acid and linolenic acid, alkylarenesulphonic acids bearing one or two saturated or unsaturated fatty chains on the ring, such as nonylbenzenesulphonic acid, dodecylbenzenesulphonic acid, didodecylbenzenesulphonic acid, nonyltoluenesulphonic acid, nonylxylenesulphonic acid, dodecyltoluenesulphonic acid and hexadecylbenzenesulphonic acid, polycyclic acids containing condensed rings, such as abietic acid and the resinous acids derived from abietic acid, the monohydrocarbyl esters and dihydrocarbyl esters of phosphoric acid, also referred to as monohydrocarbylphosphoric acids and dihydrocarbylphosphoric acids, for which the hydrocarbon radical is chosen from alkyl radicals such as butyl, ethyl, 2-ethylhexyl, octyl, nonyl, decyl, dodecyl, hexadecyl, 9-octadecenyl and octadecyl, mixtures of fatty-chain carboxylic acids and mixtures of resinous acids and fatty-chain carboxylic acids.

The sulphur-donating coupling agent, which is used in the preparation of the bitumen/polymer compositions according to the invention, may consist of a product chosen from the group formed by elemental sulphur, hydrocarbyl polysulphides, sulphur-donating vulcanization accelerators and mixtures of such products with each other and/or with non-sulphur-donating vulcanization accelerators. In particular, the sulphur-donating coupling agent is chosen from the products M which include, by weight, from 0% to 100% of a component A consisting of one or more sulphur-donating vulcanization accelerators and from 100% to 0% of a component B consisting of one or more vulcanization agents chosen from elemental sulphur and hydrocarbyl polysulphides, and the products N, which include a component C consisting of one or more non-sulphur-donating vulcanization accelerators and a product M in a weight ratio of the component C to the product M ranging from 0.01 to 1 and preferably from 0.05 to 0.5.

The elemental sulphur which may be used to constitute, in part or in total, the coupling agent is advantageously flowers of sulphur and preferably sulphur crystallized in the orthorhombic form and known under the name alpha sulphur.

The hydrocarbyl polysulphides which may be used to form a part or all of the coupling agent may be chosen from those which are defined in the citation FR-A-2,528,439 and which correspond to the general formula

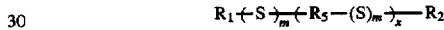

in which $R_1$ and $R_2$ each denote a saturated or unsaturated $C_1$ to $C_{20}$ monovalent hydrocarbon radical or are joined together to constitute a saturated or unsaturated $C_1$ to $C_{20}$ divalent hydrocarbon radical, forming a ring with the other associated groups of atoms in the formula, $R_5$ is a saturated or unsaturated $C_1$ to $C_{20}$ divalent hydrocarbon radical, the—$(S)m$—groups representing divalent groups each formed of m sulphur atoms, it being possible for m to be different from one of the said groups to another and denoting integers ranging from 1 to 6 with at least one m being equal to or greater than 2, and x represents an integer taking values from 0 to 10. Preferred poly-sulphides correspond to the formula $R_3$—$(S)p$—$R_3$, in which $R_3$ denotes a $C_6$ to $C_{16}$ alkyl radical, for example hexyl, octyl, dodecyl, tert-dodecyl, hexadecyl, nonyl and decyl, and—(S) p—represents a divalent group formed by a chain of p sulphur atoms, p being an integer ranging from 2 to 5.

When the coupling agent includes a sulphur-donating vulcanization accelerator, this accelerator may be chosen in particular from the thiuram polysulphides of formula

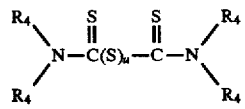

in which the groups $R_4$, which may be identical or different, each represent a $C_1$ to $C_{12}$ and preferably a $C_1$ to $C_8$ hydrocarbon radical, especially an alkyl, cycloalkyl or aryl radical, or alternatively two radicals $R_4$ attached to the same nitrogen atom are linked together to form a divalent $C_2$ to $C_8$ hydrocarbon radical and u is a number ranging from 2 to 8. Examples of such vulcanization accelerators which may especially be mentioned are the compounds dipentamethylenethiuram disulphide, dipenta-methylenethiuram tetrasulphide, dipentamethylenethiuram hexasulphide, tetrabutylthiuram disulphide, tetraethyl-thiuram disulphide and tetramethylthiuram disulphide.

Other examples of sulphur-donating vulcanization accelerators which may also be mentioned are alkylphenol disulphides, and disulphides such as morpholine disulphide and caprolactam N,N'-disulphide.

The non-sulphur-donating vulcanization accelerators which may be used to form the component C of the coupling agents of product N type may be sulphur-containing compounds chosen especially from mercaptobenzothiazole and derivatives thereof, in particular metal benzothiazole thiolates and especially benzothiazolesulphenamides, dithiocarbamates of formula

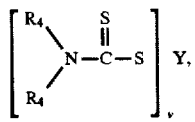

in which the groups $R_4$, which may be identical or different, have the meaning given above, Y represents a metal and v denotes the valence of Y, and thiuram monosulphides of formula

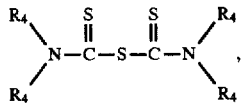

in which groups $R_4$ have the meaning given above.

Examples of vulcanization accelerators of the mercaptobenzothiazole type may be such as mercaptobenzothiazole, benzothiazole thiolate of a metal such as zinc, sodium or copper, benzothiazyl disulphide, 2-benzothiazolepentamethylenesulphenamide, 2-benzothiazolethiosulphenamide, 2-benzothiazoledihydrocarbylsulphenamides for which the hydrocarbon radical is an ethyl, isopropyl, tert-butyl or cyclohexyl radical, and N-oxydiethylene-2-benzothiazolesulphenamide.

Among the vulcanization accelerators of the dithiocarbamate type of abovementioned formula, there may be mentioned the compounds: dimethyldithiocarbamates of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate.

As examples of thiuram monosulphides having the formula given above, there may be mentioned compounds such as dipentamethylenethiuram monosulphide, tetramethylthiuram monosulphide, tetraethylthiurammonosulphide and tetrabutylthiuram monosulphide.

Other non-sulphur-donating vulcanization accelerators, which do not belong to the families defined above, may also be used. Such vulcanization accelerators may be such as 1,3-diphenylguanidine, di-ortho-tolylguanidine and zinc oxide.

For more details on the sulphur-donating and non-sulphur-donating vulcanization accelerators which may be used to form the coupling agent, reference may be made to the citations EP-A-0,360,656 (U.S. Pat. No. 5,508,112) and EP-A-0,409,683, (U.S. Pat. No. 5,120,777) the contents of which are incorporated in the present description by way of reference, along with the contents of citation FR-A-2,528,439 (U.S. Pat. No. 4,554,313).

As a result of its composition, as mentioned above, the coupling agent may be of the monocomponent type or of the multicomponent type, it being possible for the coupling agent of the multicomponent type to be formed prior to its use or alternatively produced in situ in the medium in which it needs to be present. The coupling agent of the preformed multicomponent type or of the monocomponent type or the components of the coupling agents of the multicomponent type formed in situ may be used as they are, for example in the molten state, or alternatively as a mixture, for example in solution or in suspension, with a diluent, for example a hydrocarbon compound.

The process for the preparation of the bitumen/polymer compositions according to the invention is advantageously carried out by first placing the elastomer which is crosslinkable with sulphur and the adjuvant of formula R—X in contact with the bitumen or the mixture of bitumens intended to form the bituminous matrix of the compositions, using proportions of elastomer and of adjuvant having values, relative to the bituminous matrix, chosen within the ranges defined above for these proportions, working at temperatures between 100° C. and 230° C., more particularly between 120° C. and 190° C., and with stirring, for a sufficient period, generally of the order of a few tens of minutes to a few hours and, for example, of the order of 1 hour to 8 hours, in order to form a homogeneous mixture, and then by incorporating into the said mixture the sulphur-donating coupling agent in an appropriate amount chosen within the ranges defined above for the said amount and while keeping the whole mixture stirring at temperatures between 100° C. and 230° C., more particularly between 120° C. and 190° C., and which may or may not be identical to the temperatures of mixing the elastomer and the adjuvant with the bituminous matrix, for a period at least equal to 10 minutes and generally ranging from 10 minutes to 5 hours, more particularly from 30 minutes to 180 minutes, in order to form a reaction product constituting the non-gellable bitumen/polymer composition.

In the mode of use given above, the adjuvant may be incorporated into the bitumen or bitumen mixtures before or after the elastomer, it being equally possible to envisage a simultaneous incorporation. Preferably, the adjuvant is incorporated into the bitumen or mixture of bitumens before the elastomer.

The bitumen/polymer compositions according to the invention may also include various additives and especially promoters of adhesion of the final bitumen/polymer binder to mineral surfaces. To do this, the said additives may be added to the reaction medium formed of the bitumen or mixture of bitumens, the elastomer which is crosslinkable with sulphur, the adjuvant of formula R—X and the coupling agent, at any particular moment in the formation of the said reaction medium and preferably before addition of the coupling agent to a medium consisting of the other ingredients.

The bitumen/polymer compositions according to the invention are non-gellable and stable on storage up to high temperatures which may reach values of the order of 260° C. They may be used as they are or else diluted with variable proportions of a bitumen or of a mixture of bitumens in order to constitute bitumen/polymer binders having a chosen content of crosslinked elastomer, which may either be equal to (non-diluted composition) or else less than (diluted composition) the content of cross-linked elastomer in the corresponding initial bitumen/polymer compositions. The bitumen/polymer compositions may be diluted with the bitumen or mixture of bitumens either directly after the said compositions have been obtained, when an almost immediate use of the resulting bitumen/polymer binders is required, or alternatively after a longer or shorter period of storage of the bitumen/polymer compositions, when a delayed use of the resulting bitumen/polymer binders is envisaged. The bitumen or mixture of bitumens used to dilute a bitumen/polymer composition according to the invention may be chosen from the bitumens defined above as being suitable for the preparation of the bitumen/polymer compositions.

The dilution of a bitumen/polymer composition according to the invention with a bitumen or a mixture of bitumens in order to form a bitumen/polymer binder having a chosen content of crosslinked elastomer, which is less than that of the bitumen/polymer composition, is generally performed by bringing together, with stirring and at temperatures between 100° C. and 230° C. and more particularly between 120° C. and 190° C., suitable proportions of the bitumen/polymer composition and of bitumen or mixture of bitumens. For example, the amount of dilution bitumen or mixture of bitumens may be chosen so that the bitumen/polymer binder resulting from the dilution of the bitumen/polymer composition includes, by weight of the bituminous matrix, between 0.5% and 5% of crosslinked elastomer.

The bitumen/polymer binders consisting of the bitumen/polymer compositions according to the invention or resulting from the dilution of the said compositions with a bitumen or mixture of bitumens, to the desired content of crosslinked elastomer in the said binders, may be applied, directly or after placing in aqueous emulsion, to the production of road coatings of the surface coating type, to the production of mixes laid under hot or cold conditions, or alternatively to the production of leaktight coatings.

The invention is illustrated by the following examples, which are given without any limitation.

In these examples, the amounts and percentages are expressed by weight except where otherwise mentioned.

EXAMPLE 1

Preparation of a control bitumen/polymer composition

Working at 175° C. with stirring, 1,000 parts of a direct distillation bitumen having a penetrability equal to 91, a kinematic viscosity at 100° C. of $1.7 \times 10^{-4}$ m$^2$/s, a ring and ball softening point (according to standard NF T 66 008) equal to 46° C. and a Fraass breaking point (according to standard IP 80/53) equal to $-18.5°$ C., were mixed together with 64 parts of a diblock copolymer of styrene and butadiene having a mean viscometric molecular weight equal to about 75,000 and including 75% butadiene. After mixing for 5 hours with stirring, a homogeneous mass was obtained.

To the abovementioned homogeneous mass, maintained at 175°C., were then added 2 parts of crystallized sulphur and the mixture was stirred for about another 60 minutes.

A very viscous product having the appearance of a gel which is impossible to handle was collected.

EXAMPLE 2

Preparation of a bitumen/polymer composition according to the invention

Working at 175° C. with stirring, 10.76 parts of pelargonic acid were incorporated into 1,000 parts of a bitumen identical to the bitumen used in Example 1, and the mixture obtained was kept at the said temperature for 20 minutes.

While still working at a temperature of 175° C., 64.7 parts of a block copolymer identical to that used in Example 1 was then incorporated, with stirring, into the mixture of bitumen and pelargonic acid. After mixing for hours with stirring, a homogeneous mass was obtained.

To this homogeneous mass, maintained at 175° C., were then added 2.15 parts of crystallized sulphur and the mixture was stirred for about another 60 minutes.

A non-gelled bitumen/polymer composition (product II) was obtained, having the penetrability and ring and ball softening point values given in Table I compared with those for the pure bitumen (product I.a) and with those for the control bitumen/polymer composition of Example 1 (product I.b).

TABLE I

| Product | Polymer content (weight %) | Penetrability (1/10 mm) | Softening point (°C.) |
|---------|---------------------------|-------------------------|----------------------|
| I.a | 0 | 91 | 46 |
| I.b | 6 | GEL | |
| II | 6 | 106 | 87.5 |

As shown by the data in Table I, the use of pelargonic acid (anti-gelling adjuvant according to the invention) allows the preparation of a non-gelled bitumen/polymer composition with a high polymer content (6% by weight) having a markedly improved ring and ball softening point. The corresponding control composition prepared in the absence of pelargonic acid or other adjuvant according to the invention is gelled and impossible to handle.

EXAMPLES 3 TO 8

Preparation of bitumen/polymer compositions according to the invention by changing the nature of the anti-gelling adjuvant The process was performed as described in Example 2, except that the nature of the anti-gelling adjuvant is changed from one example to the next, the other operating conditions being those of Example 2.

Nature of the anti-gelling adjuvant
 Example 3: oleic acid
 Example 4: palmitic acid
 Example 5: abietic acid
 Example 6: mixture of linear $C_{16}$ to $C_{18}$ fatty acids and natural resinous acids having the following characteristics:
  density at 20° C.: 0.990
  acid number: 155 mg KOH/g
  saponification number: 160 mg KOH/g
  linear $C_{16}$ to $C_{18}$
  fatty acids: 40%
  resinous acids: 50%
  unsaponifiable material: 10%
 Example 7: mixture of linear natural fatty acids and resinous acids having the following characteristics:
  density at 20° C.: 0.942
  acid number: 185 mg KOH/g
  saponification number: 194 mg KOH/g
  iodine number: 125
  linear $C_{16}$ to $C_{18}$
  fatty acids: 66%
  resinous acids: 30%
  unsaponifiable material: 4%
 Example 8: distillation residue of a mixture of acids having the following characteristics:
  density at 20° C.: 1.075
  acid number: 40 mg KOH/g
  saponification number: 90 mg KOH/g
  resinous acids: 20%
  linear $C_{16}$ to $C_{18}$
  fatty acids: 12%
  unsaponifiable material: 68%

The bitumen/polymer compositions obtained are denoted "Product Z.a", Z being the example number in Roman numerals.

Each of the bitumen/polymer compositions denoted "Product Z.a" was diluted with an equivalent weight of starting bitumen, the process being performed with stirring at 175° C. for 60 minutes, to give a bitumen/polymer binder denoted "Product Z.b".

The penetrability and RBSP (ring and ball softening point) values of the "Products Z.a" (bitumen/polymer compositions) and the penetrability and RBSP values and the rheological characteristics in traction (according to standard NF T 46 002) of the "Products Z.b" (bitumen/polymer binders obtained by dilution of the compositions) are collated in Table II.

acid. After mixing for 5 hours with stirring, a homogeneous mass was obtained.

To this homogeneous mass, maintained at 185° C., were then added 2.8 parts of crystallized sulphur and the mixture was stirred for about another 60 minutes.

A non-gelled bitumen/polymer composition (product IX.a) including about 9% by weight of styrene/butadiene copolymer was obtained.

Table III below gives the penetrability and RBSP values of the composition thus obtained, measured during storage of the said composition at high temperature (about 163° C.).

TABLE II

| Production | Adjuvant | Polymer (weight %) | Penetrability (1/10 mm) | BRSP (°C.) | Traction Test | | | | |
|---|---|---|---|---|---|---|---|---|---|
| | | | | | Temperature (°C.) | Speed (mm/min) | σt (bar) | σb (bar) | εb (%) |
| III.a | Oleic | 6 | 71 | 79 | | | | | |
| III.b | acid | 3 | 82 | 53 | 20 | 500 | 1.53 | 0.50 | >900 |
| | | | | | 5 | 500 | 15.3 | 5.26 | 867 |
| IV.a | Palmitic | 6 | 67 | 79 | | | | | |
| IV.b | acid | 3 | 81 | 53 | 20 | 500 | 1.61 | 0.58 | >900 |
| | | | | | 5 | 500 | 15.6 | 4.87 | >900 |
| V.a | Abietic | 6 | 58 | 78 | | | | | |
| V.b | acid | 3 | 64 | 54 | 20 | 500 | 1.85 | 0.64 | >900 |
| | | | | | 5 | 500 | 17.8 | 5.45 | 810 |
| VI.a | Fatty | 6 | 64 | 79 | | | | | |
| VI.b | acids | 3 | 72 | 53 | 20 | 500 | 1.73 | 0.59 | >900 |
| | | | | | 5 | 500 | 16.5 | 4.77 | 700 |
| VII.a | Fatty | 6 | 67 | 79 | | | | | |
| VII.b | acids | 3 | 72 | 54 | 20 | 500 | 1.83 | 0.60 | >900 |
| | | | | | 5 | 500 | 17 | 5.14 | >900 |
| VIII.a | Fatty | 6 | 59 | 84 | | | | | |
| VIII.b | acids | 3 | 75 | 54 | 20 | 500 | 1.81 | 0.66 | >900 |
| | | | | | 5 | 500 | 16.2 | 5.69 | >900 |
| I.b | None | 6 | GEL | | | | | | |
| I.a | None | 0 | 91 | 46 | 20 | 500 | 1.2 | 900 | |
| | | | | | 5 | 500 | FRAGILE | | |

σt: threshold strain
σb: breaking strain
εb: breaking elongation

In view of the results featured in Table II, it still appears that the use of adjuvants according to the invention, of the fatty acid type here, allows the preparation of non-gelled bitumen/polymer compositions with a ring and ball softening point which is substantially enhanced compared with pure bitumen. The bitumen/polymer binders obtained by dilution of these compositions using bitumen have excellent mechanical properties and especially an excellent low-temperature breaking elongation.

The control bitumen/polymer composition (product I.b), prepared in the absence of adjuvant according to the invention, is gelled and impossible to handle.

EXAMPLE 9

Preparation of a bitumen/polymer composition according to the invention using an adjuvant of the sulphonic acid type Working at 185° C. with stirring, 3.3 parts of a didodecylbenzenesulphonic acid (benzenesulphonic acid bearing 2 dodecyl radicals on the aromatic ring) were incorporated into 1,000 parts of a bitumen identical to the bitumen used in Example 1, and the entire mixture was kept at the said temperature for 30 minutes.

While still working at the same temperature and with stirring, 99.5 parts of a diblock copolymer of styrene and butadiene which is identical to that used in Example 1 was then incorporated into the mixture of bitumen and sulphonic

TABLE III

| Product | Period of storage at 163° C. (hours) | Penetrability (1/10 mm) | RBSP (°C.) |
|---|---|---|---|
| IX.a | 0 | 58 | 92.5 |
| | 48 | 60 | 92.5 |
| | 96 | 59 | 95 |
| | 144 | 60 | 99 |
| | 240 | 58 | 101 |

By carrying out the preparation of a control bitumen/polymer composition under the conditions described above, but in the absence of the sulphonic acid adjuvant, the reaction medium gelled in the reactor immediately after the addition of sulphur.

Using the bitumen/polymer composition obtained above (product IX.a), a bitumen/polymer binder (product IX.b) containing 3% styrene/butadiene copolymer was prepared. To do this, 100 parts of the said composition, withdrawn 120 minutes after introduction of the sulphur, were mixed with 200 parts of the pure starting bitumen, the mixing operation being performed with stirring at 185° C. for 90 minutes.

Table IV gives the penetrability and RBSP values as well as the traction properties of the bitumen/polymer binder (product IX.b) obtained.

TABLE IV

| Product | Penetrability (1/10 mm) | RBSP (°C.) | Traction at 5° C. and 500 mm/min | | |
|---|---|---|---|---|---|
| | | | σt (bar) | σb (bar) | εb (%) |
| IX.b | 70 | 57.5 | 19.93 | 7.67 | >900 |

EXAMPLE 10

Preparation of a bitumen/polymer composition according to the invention using an adjuvant of the sulphonic acid type The process was performed as described in Example 9, except that the adjuvant was replaced by the same amount of a xylenesulphonic acid bearing a linear $C_{16}$ to C18 fatty alkyl radical on the ring, the said acid having a molar mass of 430.

A non-gelled bitumen/polymer composition (product X.a) including about 9% styrene/butadiene copolymer was obtained.

Table V gives the penetrability and RBSP values for the composition thus obtained, measured during storage of the said composition at high temperature (about 163° C.) for several days.

TABLE V

| Product | Period of storage (hours) | Penetrability (1/10 mm) | RBSP (°C.) |
|---|---|---|---|
| X.a | 0 | 61 | 90.6 |
| | 48 | 60 | 91 |
| | 72 | 60 | 94 |
| | 120 | 58 | 96 |
| | 240 | 55 | 98 |

EXAMPLE 11

Preparation of a bitumen/polymer composition according to the invention using an adjuvant of the alkylphosphoric acid type Working at 185° C. with stirring, 16 parts of an equimolar mixture of mono- and bis(2-ethylhexyl)phosphoric acids, prepared by reaction of 2-ethylhexanol and phosphorus pentoxide in a 3:1 molar ratio, were incorporated into 1,000 parts of a bitumen identical to the bitumen used in Example 1, and the mixture was kept at a temperature of 185° C. for 20 minutes.

While still working at the same temperature with with stirring, 88 parts of a diblock copolymer of styrene and butadiene which is identical to that used in Example 1 was then incorporated into the mixture of bitumen and phosphoric adjuvant. After mixing for 5 hours with stirring, a homogeneous mass was obtained.

To the said homogeneous mass, maintained at 185° C., were then added 2.3 parts of crystallized sulphur and the mixture was stirred for about another 60 minutes.

A non-gelled bitumen/polymer composition (product XI.a) including about 8% by weight of styrene/butadiene crosslinked copolymer was obtained.

Table VI below gives the penetrability and RBSP values for the composition thus obtained, measured during storage of the said composition at high temperature, namely about 160° C.

TABLE VI

| Product | Period of storage at 163° C. (hours) | Penetrability (1/10 mm) | RBSP (°C.) |
|---|---|---|---|
| XI.a | 0 | 50 | 86 |
| | 48 | 51 | 88 |
| | 96 | 49 | 89 |
| | 144 | 49 | 89 |
| | 240 | 47 | 91 |

By carrying out the preparation of a control bitumen/polymer composition under the operating conditions of the present example, but in the absence of the phosphoric adjuvant, the reaction medium gelled immediately after addition of the sulphur.

EXAMPLE 12

Preparation of a bitumen/polymer composition according to the invention using an adjuvant of the alkylphosphoric acid type The process was performed as described in Example 9, except that the adjuvant of Example 9 was replaced by the same amount of an equimolar mixture of mono- and diethylphosphoric acids.

A non-gelled bitumen/polymer composition having a dynamic viscosity at 140° C. equal to 21 Poises and including about 9% of crosslinked styrene/butadiene diblock copolymer (product XII.a) was thus obtained.

Table VII below gives the penetrability and RBSP values for the said composition thus obtained, measured during storage of this composition at high temperature, namely about 163° C.

TABLE VII

| Product | Period of storage at 163° C. (hours) | Penetrability (1/10 mm) | RBSP (°C.) |
|---|---|---|---|
| XII.a | 0 | 54 | 87 |
| | 48 | 52 | 87 |
| | 96 | 52 | 88 |
| | 240 | 51 | 88 |

We claim:

1. Non-gellable bitumen/polymer compositions which are stable on storage at high temperature, in the form of a homogenous mass formed of a bituminous matrix comprised of a bitumen or of a mixture of bitumens and in which there is uniformly distributed an elastomer crosslinked in situ with sulphur, in an amount between 3 and 30% of the weight of the bituminous matrix, and wherein an adjuvant, acting as an anti-gelling agent, is also present in the bituminous matrix in an amount between 0.1% and 5% of the weight of the said matrix, said adjuvant consisting of one or more compounds of formula R—X, in which R is a monovalent organic radical with 2 to 50 carbon atoms and X is selected from the group consisting of $$-\overset{\overset{O}{\|}}{C}-OH, \quad -\overset{\overset{O}{\|}}{\underset{\underset{O}{\|}}{S}}-OH \quad \text{and} \quad -O-\overset{\overset{O}{\|}}{P}\diagdown\overset{-OY}{OH},$$

and Y represents a hydrogen atom or said radical R.

2. Compositions according to claim 1, wherein the adjuvant is present in the bituminous matrix in an amount between 0.2 % and 3 % of the weight of the said matrix.

3. Compositions according to claim 1 wherein the formula R—X representing the adjuvant, the radical R is a monovalent organic radical with 2 to 40 carbon atoms.

4. Compositions according to claim 1 wherein, in the formula R—X representing the adjuvant, the radical R is saturated or unsaturated monovalent hydrocarbon radical.

5. Compositions according to claim 4, wherein the said radical R is a linear or branched alkyl or alkenyl, alkylaryl, alkadienyl, alkatrienyl or polycyclic containing condensed rings.

6. Compositions according to claim 1 wherein the compounds of formula R—X are selected from the group consisting of carboxylic acids containing a saturated or unsaturated fatty hydrocarbon chain, alkylarenesulphonic acids bearing one or two saturated or unsaturated fatty hydrocarbon chains on the arene ring, polycyclic acids containing condensed rings, abietic acid and resinous acids derived from abietic acid, monoalkylphosphoric acids, dialkylphosphoric acids and mixtures of fatty-chain carboxylic acids and resinous acids.

7. Compositions according to claim 1 wherein the elastomer crosslinked with sulphur amounts between 5 % and 25 % of the weight of the bituminous matrix.

8. Compositions according to claim 1 wherein the bitumen or the mixture of bitumens constituting the bituminous matrix are chosen from bitumens having a kinematic viscosity at 100° C. of between $0.5\times10^{-4}$ m$^2$/s and $3\times10^{-2}$ m$^2$/s.

9. Compositions according to claim 8 wherein the said bitumen have a kinematic viscosity of between $1\times10^{-4}$ m$^2$/s and $2\times10^{-2}$ m$^2$/s.

10. Compositions according to claim 1 wherein the bitumen or mixture of bitumens constituting the bituminous matrix has a penetrability, defined according to standard NF T 66004, of between 5 and 500.

11. Compositions according to claim 10, wherein the said penetrability is of between 20 and 400.

12. Compositions according to claim 1 wherein the crosslinked elastomer distributed in the bituminous matrix is a crosslinked random or block copolymer of styrene and a conjugated diene.

13. Compositions according to claim 12, characterized in that the said diene is selected from the group consisting of butadiene, isoprene, chloroprene, carboxylated butadiene and carboxylated isoprene.

14. Compositions according to claim 12 wherein the crosslinked random or block copolymer of styrene and conjugated diene has a weight content of styrene ranging from 5% to 50%.

15. A process for the preparation of non-gellable bitumen/polymer compositions which are stable on storage at a high temperature, said process being one in which, working at temperatures between 100° C. and 230° C. and with stirring for a period of at least 10 minutes, a bitumen or a mixture of bitumens is placed in contact with, based on the weight of the bitumen, between 3% and 30% of an elastomer which is crosslinkable with sulphur and a sulphur-donating coupling agent in an amount able to give an amount of free sulphur representing 0.1% to 20% of the weight of the polymer which is crosslinkable with sulphur in the reaction medium formed of the coupling agent, elastomer and bitumen ingredients, and wherein during the said placing in contact, the reaction medium contains an adjuvant which acts as an anti-gelling agent, said adjuvant being used in an amount between 0.1% and 5% of the weight of the bitumen and consisting of one or more compounds of the formula R—X, in which R is a monovalent organic radical with 2 to 50 carbon atoms and X is selected from the group consisting of

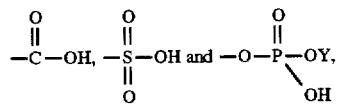

and Y represents a hydrogen atom or said radical R.

16. Process according to claim 15, wherein the adjuvant is present in the reaction medium in an amount between 0.2% and 3% of the weight of the bitumen.

17. Process according to claim 15 wherein in the formula R—X representing the adjuvant, the radical R is a monovalent organic radical with 2 to 40 carbon atoms.

18. Process according to claim 15 wherein in the formula R—X representing the adjuvant, the radical R is a saturated or unsaturated monovalent hydrocarbon radical.

19. Process according to claim 18, wherein the said radical R is linear or branched alkyl or alkenyl, alkylaryl, alkadienyl, alkatrienyl or polycyclic containing condensed rings.

20. A process according to claim 15 wherein the compounds of formula R—X are selected from the group consisting of carboxylic acids containing a saturated or unsaturated fatty hydrocarbon chain, alkylarenesulphonic acids bearing one or two saturated or unsaturated fatty hydrocarbon chains on the ring, polycyclic acids containing condensed rings, abietic acid and resinous acids derived from abietic acid, monoalkylphosphoric acids, dialkylphosphoric acids and mixtures of fatty-chain carboxylic acids and resinous acids.

21. Process according to claim 15 wherein the elastomer which is crosslinkable with sulphur is used in an amount representing between 5% and 25% of the weight of the bitumen.

22. Process according to claim 15 wherein the bitumen or mixture of bitumens has a kinematic viscosity at 100° C. of between $0.5\times10^{-4}$ m$^2$/s and $3\times10^{-2}$ m$^2$/s.

23. Process according to claim 22, wherein the said viscosity is between $1\times10^{-4}$ m$^2$/s and $2\times10^{-2}$ m$^2$/s.

24. Process according to claim 15 wherein the bitumen or mixture of bitumens has a penetrability, defined according to standard NF T 66004, of between 5 and 500.

25. Process according to claim 24, wherein the said penetrability is between 20 and 400.

26. Process according to claim 15 wherein the elastomer which is crosslinkable with sulphur is of the type random or block copolymer of styrene and a conjugated diene.

27. Process according to claim 26, wherein the said diene is selected from the group consisting of butadiene, isoprene, chloroprene, carboxylated butadiene and carboxylated isoprene.

28. Process according to claim 26 wherein the copolymer of styrene and conjugated diene includes 5 to 50 % by weight of styrene.

29. Process according to claim 26 wherein the mean viscometric molecular weight of the copolymer of styrene and conjugated diene is between 10,000 and 600,000.

30. Process according to claim 29, wherein the said molecular weight is between 30,000 and 400,000.

31. Process according to one of claim 15 wherein the sulphur-donating coupling agent is chosen from the group consisting of elemental sulphur, hydrocarbyl polysulphides, sulphur-donating vulcanization accelerators, and mixtures of such products with each other and with non-sulphur-donating vulcanization accelerators.

32. Process according to claim 15 wherein the sulphur-donating coupling agent is used in an amount able to give an amount of free sulphur representing 0.5% to 10% of the weight of the polymer which is crosslinkable with sulphur.

33. Process according to claim 15 wherein the elastomer which is cross-linkable with sulphur and the adjuvant are first placed in contact with the bitumen or mixture of bitumens, working at temperatures between 100° C. and 230° C. and with stirring for a period of 1 hour to 8 hours, in order to form a homogeneous mixture, and then by incorporating into the said mixture the sulphur-donating coupling agent the whole mixture is kept stirring at temperatures between 100° C. and 230° C. and which may or may not be identical to the temperatures of mixing the elastomer and the adjuvant with the bitumen, for a period ranging from 10 minutes to 5 hours in order to form the bitumen/polymer composition.

34. Process according to claim 33, wherein the adjuvant is incorporated into the bitumen or mixture of bitumens before the elastomer.

* * * * *

UNITED STATES PATENT AND TRADEMARK OFFICE
CERTIFICATE OF CORRECTION

PATENT NO. : 5,756,565
DATED : May 26, 1998
INVENTOR(S) : Laurent Germanaud, et al It is certified that error appears in the above-identified patent and that said Letters Patent is hereby corrected as shown below:

On the title page: Item [30] should read --March 26, 1993--.
Column 2, line 62, "ml/s" should read --$m^2/s$"--.

Signed and Sealed this

Eighteenth Day of May, 1999

*Attest:*

*Attesting Officer*

Q. TODD DICKINSON

*Acting Commissioner of Patents and Trademarks*